Figure 1:
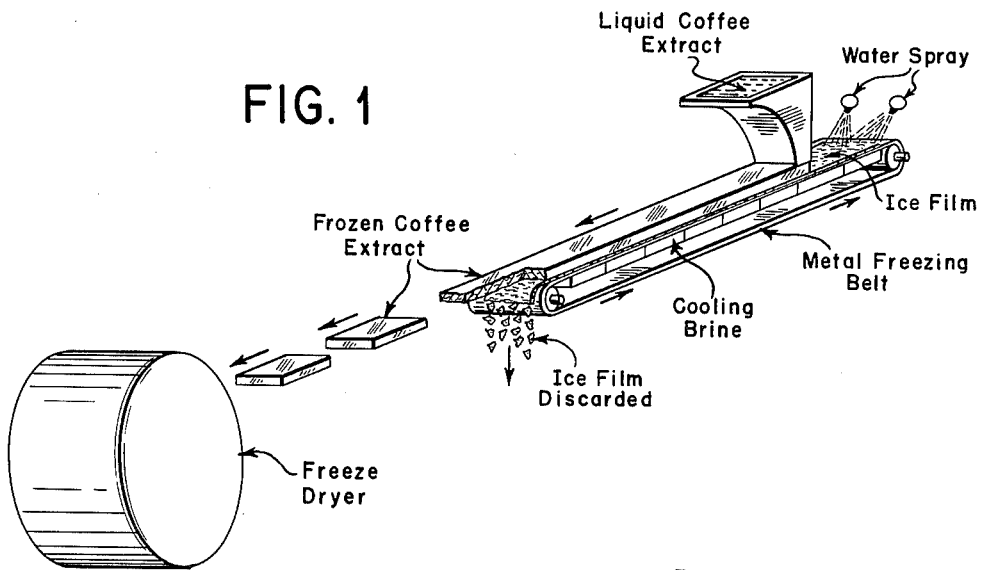

May 31, 1966     R. DE GEORGE     3,253,420

METHOD OF FREEZING COFFEE EXTRACT

Filed Feb. 3, 1965

United States Patent Office 3,253,420
Patented May 31, 1966

3,253,420
METHOD OF FREEZING COFFEE EXTRACT
Raymond De George, Jersey City, N.J., assignor to General Foods Corporation, White Plains, N.Y., a corporation of Delaware
Filed Feb. 3, 1965, Ser. No. 431,776
9 Claims. (Cl. 62—72)

This application is a continuation-in-part of Serial No. 296,653 filed July 22, 1963.

The invention relates to an improvement in the art of freezing coffee extract.

Before freeze-drying coffee it is necessary to cool the roasted extract to below the eutectic temperature of the coffee in preparation for the freeze-drying step. In freezing, the extract comes in contact with a belt or tray which retains the extract in the desired shape and form during the freezing operation. The surface of the belt or tray which comes in contact with the frozen extract many times sticks or adheres to the extract and presents a separation problem in removing the frozen extract from this surface. This adhesion problem is present in all materials having a high thermal conductivity (metals such as steel and aluminum) and is also present in many plastics. When a plastic is used which does not have this adhesion problem, other problems are presented such as toxicity and breakage of the plastic at the low temperatures employed. Moreover, this problem is aggravated as milder freezing temperatures are used, especially temperatures above —60° F.

Freeze-dried coffee has a tendency to be light brown or tan in color when fast-frozen at temperatures below —60° F. Thus, it is now desirable to freeze the coffee extract over an extended period of time at milder freezing temperatures in order to provide an ice structure which when sublimed assures a coffee extract which is dark and more coffee-like in color. In freezing coffee extract in this manner, it has become necessary to hold the charge of liquid extract on a tray or belt while freezing the extract under controlled conditions. The freezing means could be self-refrigerated with a cooling surface for freezing the extract or could transport the extract through a freezing room where the ambient temperature of the room is used to freeze the extract.

Since a clean separation of extract from the retaining surface is essential to assure an efficient freeze-drying process, various suggestions have been made to eliminate this problem. Use of a non-adhesive wax has been discouraged due to the danger of introducing foreign matter into the coffee extract. Use of non-adhesive rubber, plastic or fabric type belts and trays has presented processing difficulties at the low temperatures employed. Finally, use of plastic coatings on the retaining surface has met with the disadvantage of fissuring and cracking of the coating aside from possible toxicity problems.

It would, therefore, be desirable if a simple method were devised for preventing the adhesion of frozen extract to the surface used to retain the extract during freezing.

This invention is founded on the discovery that adhesion of frozen coffee extract to a retaining surface is avoided by applying a film of an aqueous liquid on said surface to thereby coat said surface, freezing said film, applying a body of liquid coffee extract having a temperature sufficiently low to avoid melting of the frozen film to said coated surface, and maintaining said film in a frozen state while freezing the coffee extract.

Figure 2:
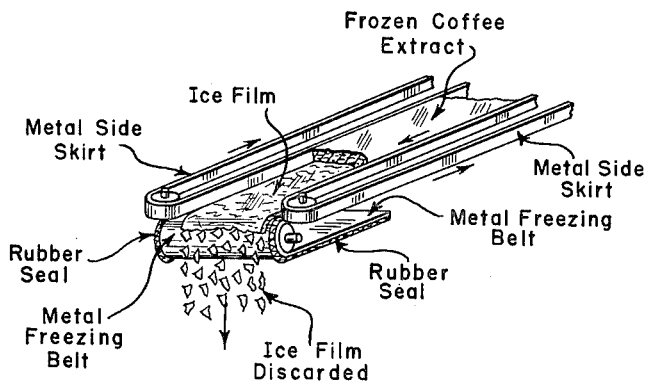

In the drawing, FIGS. 1 and 2 disclose a preferred embodiment of this invention wherein liquid extract is frozen on a metal freezing belt. FIG. 1 shows the belt freezer without the side-skirts or retaining walls for keeping the extract on the belt. FIG. 2 shows the freezing belt with the side-skirts for retaining the liquid extract on the freezing belt until it is frozen.

Figure 3:
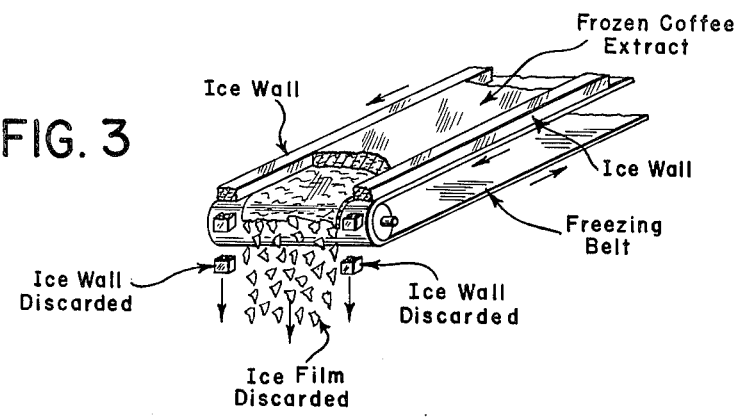

FIGURE 3 shows an embodiment of the invention wherein an ice wall is used in lieu of a metal skirt side wall.

As shown in FIG. 1, this invention may be applied to a metal freezing belt of the conveyor type operated by two terminal pulleys. The belt is cooled by a series of brine tanks which contact the bottom surface of the belt and serve to gradually cool the liquid extract from its ice point to below its eutectic point. A thin film of water or other aqueous liquid is sprayed by a series of spray nozzles onto the belt and is immediately frozen by the cold surface of the belt which is at a temperature of below 30° F. to provide a frozen film of water. Coffee extract cooled to a temperature sufficiently low to avoid melting of the ice film (30° to 45° F.) is then applied to the freezing belt which has been coated with a thin layer of ice. The extract is retained by retaining walls (not shown in FIG. 1) which keep the extract from flowing off the initial portion of the belt.

As indicated, the thin film of water will be sprayed or otherwise applied onto the metal surface of the conveyor belt prior to the extract being applied to the belt. Since the temperature of the belt will normally be well below 30° F. at the initial portion of the belt, the thin water spray will instantly freeze and provide a thin nonadhesive film of ice which will reduce sticking of the extract onto the metal surface of the belt as the extract freezes. Although the thickness of the water film can vary somewhat, it will usually be in the range of 0.005–0.10", and preferably 0.01–0.04". At larger thicknesses the ice film appears to present problems in operation of the belt while offering no added advantage. The presence of the thin water film between the body of coffee extract and retaining surface of the belt will allow the frozen extract to separate cleanly and easily from the terminal portion of the belt. By this method no residual frozen extract is left on the belt. Also, the frozen slabs of coffee extract are not broken and can be easily handled for further processing steps. Moreover, the thin film of frozen water fractures cleanly from the belt as the belt curves around the terminal pulley while the frozen coffee extract continues as a slab onto a discharge means which conveys the slab into a commercial freeze drying chamber wherein the coffee product may be dried by sublimation to a stable terminal moisture content.

The belt may be of plastic or metal and may be of any size. However, the belt should be long enough to allow the liquid coffee extract to be completely frozen at the mild temperatures employed. Usually a belt having a length of between 20–120 feet and a width of 1–5 feet is sufficient to freeze up to a one inch layer of coffee extract slowly over a period of at least 15 minutes so as to give a dark colored final product. In freezing the extract it is understood that the extract must be cooled from its ice point to below its eutectic point. The ice point is that point at which the extract begins to freeze while the eutectic point is that point at which the extract is completely frozen. The ice point will vary with the concentration (for 28% soluble solids it will be about 27° F.) while the eutectic point is constant regardless of concentration at about −13.5° F.

In applying the chilled coffee extract to the freezing belt the side skirts which may be of plastic, rubber, or other pliable material must fit tightly against the metal surface of the belt to prevent leakage of extract while at the same time providing for an easy removal of frozen extract at the discharge end of the belt. The side skirts serve the function of retaining the liquid or semi-liquid extract within the boundaries of the freezing zone. However, here also problems of adhesion and sticking of extract to the side skirts has presented problems.

Therefore, as shown in FIG. 2, it is contemplated as a preferred embodiment of this invention that the side skirts be formed of sheet metal having a high thermal conductivity enabling the side skirts to be cooled to a degree whereat the water spray will instantly freeze onto the portion of the metal side skirt which contacts the liquid coffee extract. The metal side skirts can be sealed to the freezing belt by using a thin film of water which joins the two members as the water film freezes. Alternatively, the metal side skirts can form a watertight seal with a resilient rubber or plastic gasket bonded to the edge of the freezing belt. Also, the resilient gasket may be bonded to the edge of the metal side skirt, if desired. Any arrangement may be used which allows a metal-rubber-metal seal. The height of the side skirt will vary depending on the desired depth of the body of coffee extract to be frozen. The side skirts with the thin film of ice will be found to separate cleanly from the frozen slab of coffee extract at the terminal portion of the belt. Each side skirt may be operated by a pair of terminal pulleys positioned perpendicular to the terminal pulleys of the freezing belt. As in the freezing belt, the frozen layer of ice will fracture and fall off the metal skirt as the skirt leaves the terminal portion of the belt and curves around its terminal pulley.

While it is preferred to freeze ordinary tap water in forming the ice film of this invention, it is understood that other aqueous liquids may be used which also serve to avoid the adhesion problem. Thus, dilute coffee extract having a concentration of 1–10% soluble solids can be effectively used to prevent adhesion in the same way as water.

This invention will now be described by reference to the following specific examples.

EXAMPLE 1

Coffee extract having a soluble solids concentration at 27% and product temperature of 37° F. was applied to a moving stainless steel belt about 3 feet from the starting end of the belt. The stainless steel conveyor belt was 2 feet wide, was operated by 2 pulleys located about 50 feet apart and provided a 60 minute contact time for the coffee extract to be completely frozen. The belt was cooled by contact with 2 cold brine tanks located on the underside of the belt, one tank having a temperature of 20° F. and the other tank a temperature of −30° F. The first half of the belt using a 20° F. brine solution had a contact time of 30 minutes while the second half of the belt employing a −30° F. brine solution also had a contact time of 30 minutes. Additional freezing was provided by refrigerated fins having a temperature of −35° F. to −25° F. located 3 inches above the coffee layer. The coffee layer was applied at a thickness of about 0.5″ and the liquid extract was retained by rubber side skirts operated by terminal pulleys at opposite ends of the belt. The skirts moved at the same rate as the belts.

The thin water film was applied to the initial portion of the belt before introducing the coffee extract. This was accomplished by spraying water onto the belt in a thin film having a thickness of about 0.01 inch. The thin water film was frozen instantly by passing the steel belt over copper coils which contained −35° F. brine. Under these conditions the steel belt had a frozen film of water thereon when the belt contacted the body of liquid coffee extract. The frozen film was retained in a solid state while the body of coffee extract was cooled from its ice point of about 27° F. to below its eutectic point of −13.5° F. in a period of 60 minutes. At the terminal portion of the belt it was observed that the 0.5″ slab of frozen coffee extract parted easily and cleanly from the steel belt as it curved around the terminal pulley. The thin layer of frozen water fractured and fell cleanly off the belt. The slowly frozen extract was conveyed dricetly as a slab into a commercial freeze drying unit wherein the frozen extract was freeze-dried by sublimation at a vacuum of below 500 microns to a stable moisture content. The dried product was uniformly dark brown and very coffee-like in color.

EXAMPLE 2

The procedure of Example 1 was followed with the exception that stainless steel sheet metal side-skirts were used in place of the rubber side-skirts. The steel side-skirts were 0.6 inch in height, had a thickness of 0.1 inch and included an 0.2 inch rubber lip adapted to contact the freezing belt to provide a watertight seal. The two steel side-skirts were each operated by a pair of terminal pulleys adapted to move the side-skirts at the same rate as the freezing belt. The steel side-skirts were cooled by brine tanks having a temperature of −40° F. at the initial portion of the belt and a thin water film was applied onto the side skirts at the same time the film was sprayed onto the freezing belt to give a frozen ice film about 0.01″ thick. Under these conditions the frozen films on the side-skirt and freezing belt did not melt when 37° F. extract was applied to the belt and slowly frozen. The frozen slab of coffee extract was found to separate cleanly and easily at the terminal portion of the belt and provided a distinct improvement over the rubber side-skirts of Example 1 which had no ice coating.

While this invention has been described by reference to specific examples, it is understood to be limited only by the appended claims.

What is claimed is:

1. A process for facilitating separation of frozen coffee extract from a retaining surface which comprises applying a film of an aqueous liquid on said surface to thereby coat said surface, freezing said film, applying a body of liquid coffee extract having a temperature sufficiently low to avoid melting of the frozen film to said coated surface, and maintaining said film in a frozen state while freezing the body of coffee extract.

2. The process of claim 1 wherein the film of aqueous liquid is water.

3. The process of claim 1 wherein the film of aqueous liquid is dilute coffee extract having a solids concentration of 1–10% soluble solids.

4. A process for facilitating separation of frozen coffee extract from a metal retaining surface which comprises spraying a film of water onto said surface to thereby coat said surface, freezing said film, applying a body of liquid coffee extract having a temperature of below 40° F. to the coated surface, and maintaining said film of water in a frozen state while freezing said coffee extract at freezing temperatures above −60° F.

5. A process for facilitating separation of frozen coffee extract from a metal retaining surface which comprises applying a film of water onto the surface to thereby coat said surface, said film being between 0.005″ and 0.10″ thick, freezing said film, applying a body of liquid coffee extract having a temperature of below 40° F. to said coated surface, and maintaining said film of water in a frozen state while freezing said body of coffee extract at freezing temperatures above −60° F.

6. The process of claim 5 wherein the film of ice is between 0.01″ and 0.04″ thick.

7. A process for facilitating separation of frozen coffee extract from a metal freezing belt having side walls for retaining the liquid extract on said belt which comprises applying a film of water to said freezing belt to coat the surface of said belt which contacts the extract to be frozen, freezing said film, applying a body of liquid coffee extract having a temperature of below 40° F. to said coated freezing belt, and maintaining said film of water in a frozen state while freezing said body of coffee extract at freezing temperatures of above −60° F.

8. The process of claim 6 wherein the freezing belt and retaining walls are of stainless steel.

9. The process of claim 7 wherein the stainless steel retaining walls are temporarily bonded to the stainless steel freezing belt by a thin film of frozen water.

References Cited by the Examiner

UNITED STATES PATENTS 2,978,883    4/1961    Jesse _____ 62—63 X

ROBERT A. O'LEARY, *Primary Examiner.*

W. E. WAYNER, *Assistant Examiner.*